United States Patent [19]

Broussard

[11] Patent Number: 5,010,860
[45] Date of Patent: Apr. 30, 1991

[54] INTERNAL COMBUSTION ENGINE WITH TWIN COMBUSTION CHAMBERS

[76] Inventor: Thomas Broussard, P.O. Box 841081, Houston, Tex. 77284-1081

[21] Appl. No.: 516,971

[22] Filed: Apr. 30, 1990

[51] Int. Cl.$^5$ .............................................. F02B 19/00
[52] U.S. Cl. .................. 123/256; 123/265; 123/64; 123/658; 123/309
[58] Field of Search .................. 123/265, 256, 658, 64, 123/21, 257, 310, 65 VC, 65 VD, 305, 309

[56] References Cited

U.S. PATENT DOCUMENTS

| | | | |
|---|---|---|---|
| 1,737,452 | 11/1929 | Dasche | 123/658 |
| 1,894,667 | 1/1933 | Church et al. | 123/658 |
| 2,980,094 | 4/1961 | Muller | 123/265 |

*Primary Examiner*—David A. Okonsky

[57] ABSTRACT

An internal-combustion engine includes two combustion spaces for each cylinder. Each combustion space is separated from the cylinder space and has a valve to open and close a passage through which communication is established between the combustion space and the cylinder space. A complete cycle consist of eight strokes of a four-stroke type engine or four strokes of a two-stroke type engine. At the start of the first expansion stroke of the cycle, the valve of the first combustion space opens to release burnt fuel into the cylinder space to power the piston. The burnt fuel from the first combustion space is expelled and fresh air is admitted into the cylinder space as in conventional four-stroke and two-stroke engines. The fresh air is compressed into the first combustion space on the first compression stroke of the cycle, and the corresponding valve closes at the end of the compression stroke. During the period when communication is established between the first combustion space and the cylinder space, the passage to the second combustion space is closed and fuel is injected into the second combustion space, ignited and burnt. On the second expansion stroke, the valve of the second combustion space opens to establish communication between the sdecond combustion space and the cylinder space. During the period when communication is established between the second combustion space and the cylinder space, fuel is injected into the first combustion space, ignited, and burnt.

1 Claim, 2 Drawing Sheets

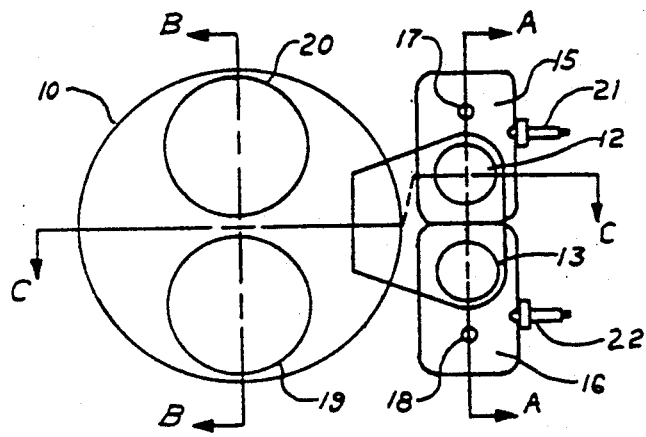
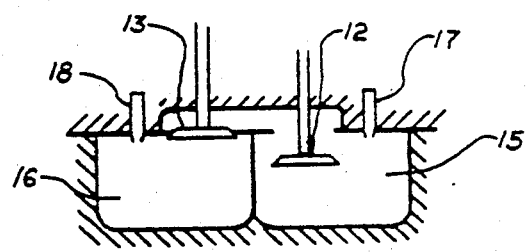
FIG.1
FIG.2
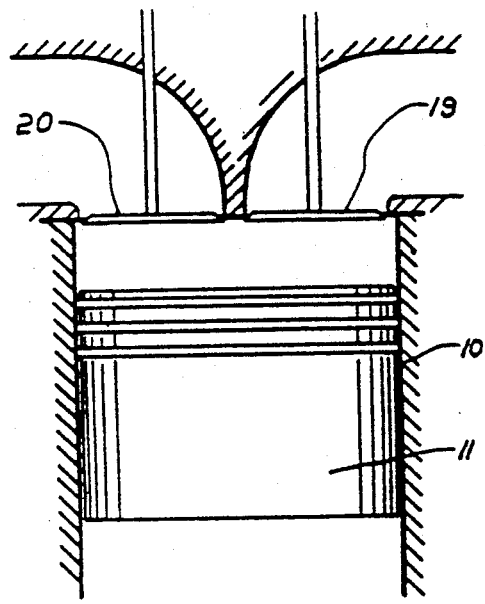
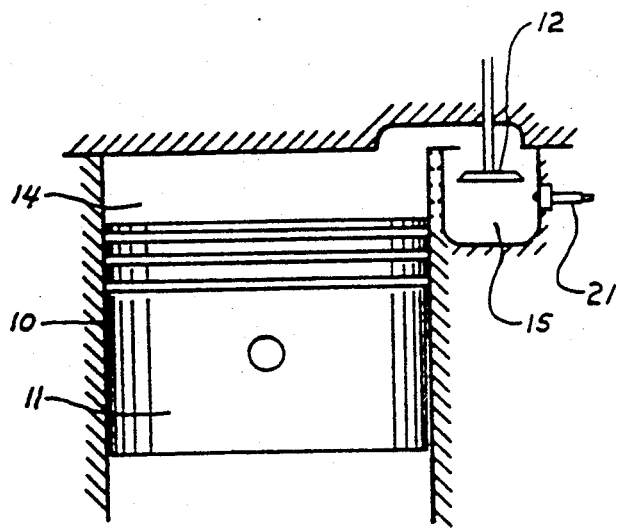
FIG.3
FIG.4

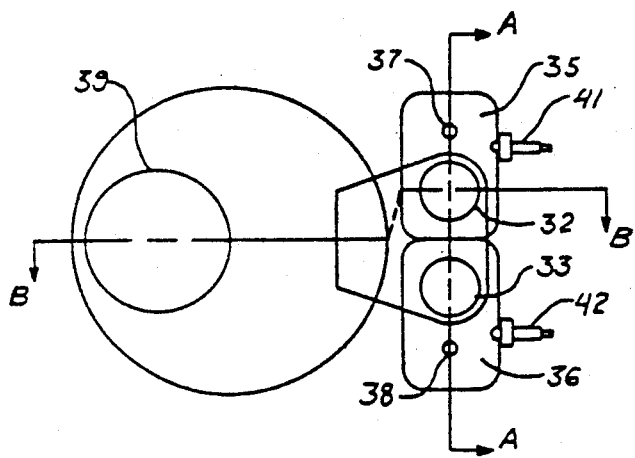
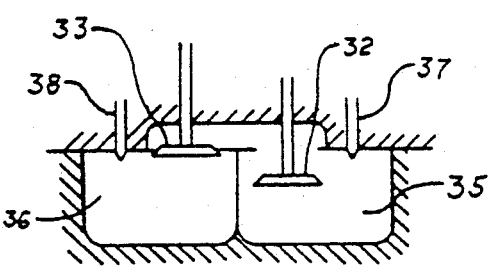
FIG.5  FIG.6
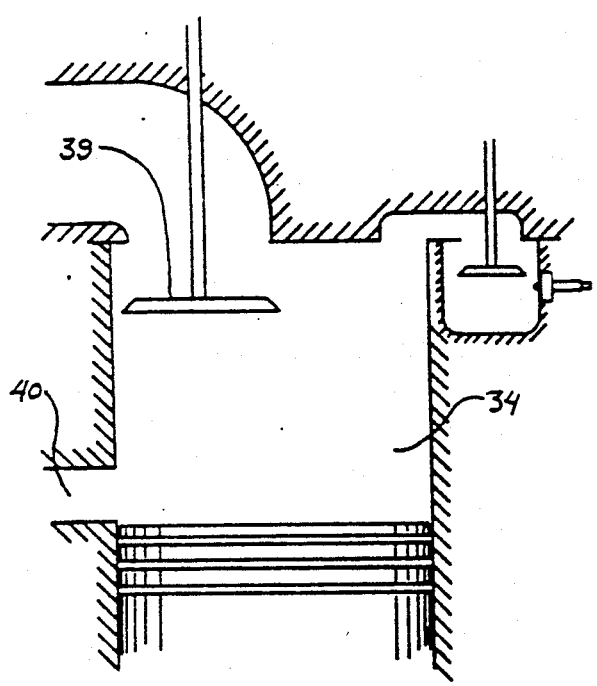
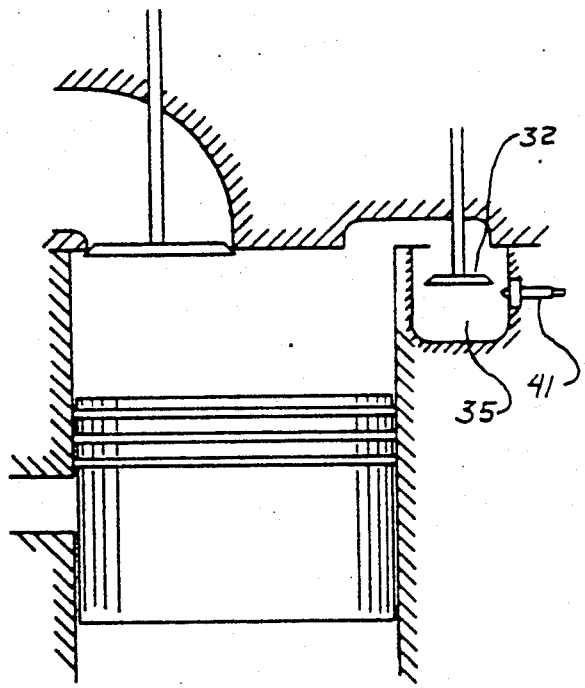
FIG.7  FIG.8

INTERNAL COMBUSTION ENGINE WITH TWIN COMBUSTION CHAMBERS

BACKGROUND OF THE INVENTION

1. Field of the invention

This invention relates to internal combustion engines, more particularly, to an engine with two alternating combustion chambers for each cylinder which offers a significantly longer time for fuel combustion and provides combustion spaces that are seperated from the cylinder to improve fuel economy, improve performance, reduce pollution, and reduce engine noise and vibration.

2. Prior ART

Conventional four-stroke and two-stroke internal-combustion engines have had the following disadvantages:

(1) Loss of power due to ignition during compression which exerts extra pressure on the piston.

(2) Hydro carbon and carbon monoxide emission due to; (a) short fuel combustion time, (b) quenching of the flame by the cooler cylinder wall, (c) long warm-up time, (d) high fuel-air ratios for spark ignition engines, and (e) expansion during combustion on the power stroke which causes the temperature of the burning fuel to drop below the level required for carbon monoxide to combine with oxygen in forming carbon dioxide.

(3) Nitrogen oxide emission produced by high temperatures.

(4) Engine vibration, roughness and noise caused by the rapid rise in pressure that is exerted directly onto the piston.

SUMMARY OF THE INVENTION

Accordingly, it is an objective of the present invention to provide a twin combustion chambers type internal-combustion-engine which reduces or eliminates the afore-mentioned disadvantages and achieves improved fuel consumption as well as reduction of noxious exhaust emissions while attaining enhanced power output per unit stroke volume of the cylinder.

This object of the invention is attained by:

(1) Providing a significantly longer time for fuel combustion by using two alternating combustion chambers. A longer time for fuel combustion offers the following advantages: (a) Fuel injection and ignition timing requirements are greatly reduced, (b) Hydro carbon and carbon monoxide has time to completely burn, and (c) Nitrogen oxide produced by high temperatures and engine knock caused by rapid rise in pressure can be reduced by reducing the rate of combustion.

(2) Separating the combustion spaces from the cylinder space which provides the following advantages; (a) quenching of the flame by the colder cylinder wall is eliminated, (b) the flame does not come in contact with the lubricating oil, (c) the reduced cooling requirement of the combustion chambers shortens warm-up time, (d) a constant volume during combustion reduces carbon monoxide emission, (e) engine vibration, roughness, and noise is reduced by preventing the rapid rise in pressure from being exerted directly onto the piston, and (f) combustion does not occur during compression.

Additional advantages of this invention are:

(1) Gasoline engines operating at higher compression ratios an leaner fuel-air mixtures for improved thermal efficiency and better fuel economy can be designed. There is ample time for the gasoline to be injected into the combustion spaces, evaporate, mix with the hot compressed air, and completely burn.

(2) The longer time for fuel combustion enables engines to operate at higher RPM for increased power output.

(3) The cooling system requirements of the invention are reduced by the elimination of advance ignition which causes power loss and consequently excess heat, by the separation of the combustion spaces from the cooler cylinder space, and by increased thermal and volumetric efficiencies.

The invention comprises two combustion spaces for each cylinder, valves which open and close passages through which communication is established between the combustion space and the cylinder space, fuel injection means, and fuel ignition means.

The various features of novelty which characterize the invention are pointed out with particularity in the claims annex to and forming a part of the disclosure.

For a better understanding of the invention, its operating advantage and specific objects attained by its use, reference should be had to the accompanying drawings and descriptive matter in which there are illustrated and described preferred embodiments of the invention.

BRIEF DESCRIPTION OF THE DRAWINGS

FIG. 1 is a top cross-sectional view of the present invention incorporating a four-stroke type engine;

FIG. 2 is a cross-sectional view taken along line A—A of FIG. 1;

FIG. 3 is a cross-sectional view taken along line B—B of FIG. 1; and

FIG. 4 is a cross-sectional view taken along line C—C of FIG. 1.

FIG. 5 is a top cross-sectional view of the present invention incorporating a two-stroke type engine;

FIG. 6 is a cross-sectional view taken along line A—A of FIG. 5; and

FIGS. 7 and 8 are cross-sectional views taken along line B—B of FIG. 5.

DETAILED DESCRIPTION OF THE INVENTION

In FIGS. 1, 2, 3, and 4, in accordance with the invention, a twin combustion chambers four-stroke type internal-combustion engine is shown. At the begining of the first expansion stroke of the cycle, the chamber valve 12 opens and burnt fuel from the combustion space 15 is released into the cylinder space 14 to power the piston 11. During the first expansion stroke, the exhaust valve 19, the intake valve 20, and the chamber valve 13 are closed. The exhaust valve 19 open to expel the burnt fuel from the cylinder space 14 on the exhaust stroke and closes at the end of the exhaust stroke. The intake valve 20 opens to admit a fresh charge of air into the cylinder space 14 on the intake stroke and closes at the end of the intake stroke. The fresh charge of air is compressed into the combustion space 15 and the chamber valve 12 closes at the end of the compression stroke. During the period when communication is established between the combustion space 15 and the cylinder space 14, the chamber valve 13 is closed, and fuel is injected into the combustion space 16 by the injector 18 and ignited either by the ignition plug 22 or by auto-ignition. On the second expansion stroke, the chamber valve 13 opens and burnt fuel from the combustion space 16 is released into the cylinder space 14 to power the piston 11. The burnt fuel is expelled and a fresh charge of air is admitted as described above. On the second compression stroke of the cycle, the air is compressed into the combustion space 16 and the chamber valve 13 closes. During the period when communication is established between the combustion space 16 and the cylinder space 14, the chamber valve 12 is closed, and fuel is injected into the combustion space 15 by the injector 17 and ignited either by the ignition plug 21 or by auto-ignition. The cycle repeats every eight strokes of the piston 11.

In FIGS. 5, 6, 7, and 8, in accordance with the invention, a twin combustion chambers two-stroke type internal-combustion engine is shown. Near the begining of the first expansion stroke, the chamber valve 32 opens and burnt fuel from the combustion space 35 is released into the cylinder space 34 to power the piston 31. During the first expansion stroke, the exhaust valve 39 and the chamber valve 33 are closed. The exhaust valve 39 opens during the expansion stroke of piston 31 in advance of uncovering the intake port 40 with sufficient time to allow the cylinder space 34 pressure to drop to atmospheric. When the intake port 40 becomes uncovered by the piston 31, as shown in FIG. 7, air is forced into the cylinder space 34 from the inlet port 40. The burnt fuel is forced from the cylinder space 34 through the exhaust port 39 by the incoming air, and the exhaust valve 39 closes. On the first compression stroke, the air in the cylinder space 34 is compressed into the combustion space 35 as shown in FIG. 8 and the chamber valve 32 closes at the end of the compression stroke. During the period when communication is established between the combustion space 35 and the cylinder space 34, the combustion valve 33 is closed, and fuel is injected into the combustion space 36 by the injector 38 and ignited either by the ignition plug 42 or by auto-ignition. On the second expansion stroke, the chamber valve 33 opens and burnt fuel from the combustion space 36 is released into the cylinder space 34 to power the piston 31. The burnt fuel is forced out and fresh air is admitted as described above. The fresh air is compressed into the combustion space 36 and the chamber valve 33 closes at the end of the compression stroke. During the period when communication is established between the combustion space 36 and the cylinder space 34, the combustion valve 32 is closed, and fuel is injected into the combustion space 35 by the injector 37 and ignited either by the ignition plug 41 or by auto-ignition. The cycle repeats every four strokes of the piston 31.

While the invention has been described in detail with reference to specific and preferred embodiments, it will be appreciated that various modifications may be made from the specific details without departing from the spirit and scope of the invention.

What is claimed is:

1. A twin combustion chamber type internal-combustion engine comprising;
    a first combustion space and a second combustion space each of a size to provide a desired compression ratio and shaped to minimize heat loss,
    an upper cylinder space of sufficient size to minimize an amount of air that remains in said upper cylinder space when a piston is at top center,
    a main passage formed in said upper cylinder space and of sufficient size to permit flow alternately therethrough between said combustion spaces and said cylinder space,
    a first combustion valve in a first passage in communication with said main passage and a second combustion valve in a second passage in communication with said main passage, said valves open and close said first and second passages to said first and second combustion spaces respectively,
    at least one exhaust valve controlling passage from said upper cylinder space,
    a first fuel injector and a second fuel injector located in said first and second combustion spaces respectively and positioned to sufficiently mix fuel and the air to form respective charges,
    a first ignition plug and a second ignition plug located in said first and second combustion spaces respectively and positioned to provide proper ignition, wherein
    said first combustion valve opens to release a burnt charge from said first combustion space into said cylinder space at the beginning of a first expansion stroke to drive said piston and remains open to receive fresh air during a first compression stroke and then closing at the end of the first compression stroke,
    said second combustion valve opens to release a burnt charge from said second combustion space at the beginning of a second expansion stroke to drive said piston and remains open to receive fresh air during a second compression stroke and then closing at the end of the second compression stroke,
    the metered amount of charge in said first and second combustion spaces being ignited respectively by said first and second ignition plugs or by auto-ignition and completely burnt during the period when said first and second combustion valves are closed.

* * * * *